United States Patent Office 3,255,112
Patented June 7, 1966

---

3,255,112
LUBRICATING OIL CONTAINING ESTER OF ALIPHATIC AMINO DICARBOXYLIC ACID
Elaine M. Hoffman, University Heights, New Brunswick, and Stephen J. Metro, Scotch Plains, N.J., assignors to Esso Research and Engineering Company, a corporation of Delaware
No Drawing. Filed Mar. 22, 1963, Ser. No. 267,317
6 Claims. (Cl. 252—51.5)

This invention relates to the reaction product of alcohol and dicarboxylic acid having an amine group, to uses of said product, and to methods for its preparation. Particularly, the invention relates to the ester condensation product of an aliphatic amino dicarboxylic acid with alcohol to form a product useful as an additive for lubricating oils, particularly synthetic ester lubricating oils, to inhibit oxidation.

The ester condensation products of alcohol and certain amino dicarboxylic acids have been found to be remarkably stable to oxidation at high temperatures and are useful as oxidation inhibitors. Small amounts of these ester products can be added to more conventional ester lubricants as additives to inhibit oxidation.

The amino dicarboxylic acids used in forming the ester additives of the invention can be represented by the general formula:

$$\text{HOOC(CH}_2)_n-\overset{\overset{\displaystyle NH_2}{|}}{\underset{\underset{\displaystyle H}{|}}{C}}-\text{COOH}$$

wherein $n$ is 2 or 3. These acids include glutamic acid and α-amino adipic acid, in either the dextrorotary and levorotary form, or as the racemic mixture.

Preferred alcohols for forming the ester are those alkanols of about 1 to about 20, preferably 5 to 13, carbon atoms. These monohydric alcohols may be either straight chain or branched chain alcohols. Among the alcohols may be mentioned n-decyl alcohol, isodecyl alcohol, n-octyl alcohol, di-2-ethylhexanol, trimethylpentanol, n-heptyl alcohol, amyl alcohols, and oxo alcohols, etc.

For even greater stability, so-called neo alcohols which have no beta hydrogens can be used. Examples of these alcohols will include alcohols having the structures:

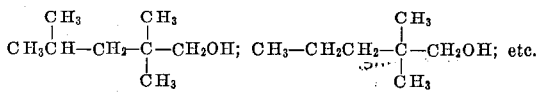

The condensation product of the invention is prepared by reaction of one mole of alcohol with one mole of the dicarboxylic acid. While not known with certainty, the reaction is believed to be as follows: using glutamic acid as the dicarboxylic acid.

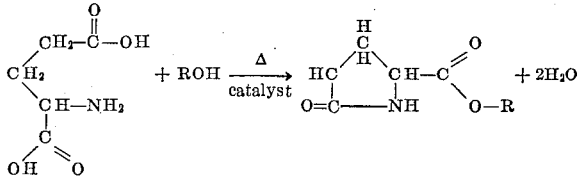

In the case of dicarboxylic acid, having a total of 6 carbon atoms, the reaction product is believed to be:

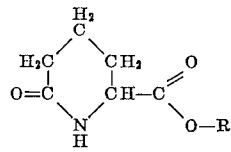

where R is the hydrocarbon portion of the alcohol.

The esters shown above are cyclic monoesters. More specifically, the esters are preferably prepared as follows:

The acid and alcohol are added to a reactor and heated under reflux conditions until the stoichiometric amount of water is taken off, i.e. 2 moles of water for every mole of dicarboxylic acid. One mole of water comes from the esterification; the other mole of water is from the cyclization.

Excess alcohol can be used to obtain a more complete reaction. Thus, good results have been obtained using 2 moles of alcohol (one mole is excess) per mole of dicarboxylic acid. A water entraining agent such as heptane or toluene can be used. Acid, basic or neutral esterification catalysts can be used, for example, sodium bisulfate, sulfuric acid, p-toluenesulfonic acid, etc. Or the condensation can be carried out with no catalyst. When the condensation reaction is complete, the reaction mixture can be vacuum stripped to remove any entraining agent remaining as well as other volatile materials which may be present, e.g. excess alcohol. If an acid catalyst has been used, it may be desirable to filter the reaction mixture and/or to neutralize it with a dilute alkaline solution, such as sodium carbonate, followed by water washing. The ester may again be vacuum stripped in order to remove any water contamination, unreacted alcohol, etc. and preferably is then distilled to give a high purity product.

The resulting condensation product can be used in an amount of 0.1 to 10.0 wt. percent, preferably 0.5 to 5.0 wt. percent, based on the weight of the total composition, in lubricating oil compositions. The lubricating oil used may be a mineral lubricating oil, a synthetic lubricating oil or any mixtures thereof. The synthetic lubricating oils include polyester lubricating oil, that is, a diester, complex ester or other ester oils hereinafter described which have more than one ester linkage per molecule.

Particularly, preferred synthetic lubricating oils are the saturated aliphatic diesters represented by the formula:

wherein R is a straight or branched chain hydrocarbon radical of a $C_6$ to $C_{12}$ alkanedioic acid, R′ and R″ represent the same or different alkyl radicals of a $C_6$ to $C_{18}$, branched or straight chain alkanol and the total number of carbon atoms in the diester molecule is about 20 or more. Specific examples of such diesters include di(2-ethylhexyl)sebacate, di($C_8$oxo)azelate or adipate, di($C_{10}$-oxo)adipate, etc. Other synthetic oils which may be used will include esters of monobasic acids (e.g. $C_{10}$oxo alcohol ester of $C_8$oxo acid), esters of glycols (e.g. $C_{13}$-oxo acid diester of tetraethylene glycol), complex esters, esters of phosphoric acid, halocarbon oils, sulfite esters, silicone oils, carbonates, formals, polyglycol-type synthetic oils, etc.

The condensation product is particularly useful with recently developed synthetic ester oils designed for high temperature use. These oils are usually fully esterified esters prepared from alcohols having no β-hydrogens and carboxylic acids having no α-hydrogens, which form esters that are exceptionally stable and are completely hindered at the ester linkage, which generally is otherwise the weakest link in an ester molecule from the standpoint of heat stability, oxidation and hydrolysis. The saturated alcohol used to prepare these high temperature esters will generally have 1 to 4 hydroxy groups, and will be free of hydrogen radicals attached to the carbon atoms beta to each of said hydroxy groups. The alcohol will generally have a total of 4 to 12 carbon atoms. The acid used to prepare the high temperature esters is usually saturated, preferably has one or two carboxylic acid groups and will be free of hydrogen atoms attached to the carbon atom alpha to the carboxylic acid group or groups. The carboxylic acid will usually contain 7 to 20 carbon atoms.

More specifically, the alcohol used to form the aforesaid high temperature oil will include those represented by the general formula:

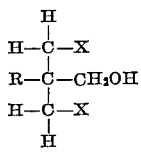

where R is a $C_2$ to $C_8$ alkyl group, or a —$CH_2OH$ group, and X is either H or OH. Examples of such alcohols include trimethylolethane, trimethylolpropane, and alcohols having the structures:

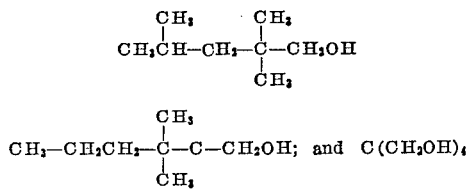

Also, included among the no β-hydrogen or neo alcohols are cyclic alcohols such as the dihydric alcohol having the formula:

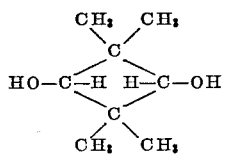

The no α-hydrogen acid will include those represented by the general formula:

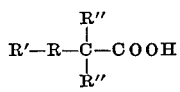

where R is an aliphatic saturated hydrocarbon group of 3 to 12 carbon atoms, R' is hydrogen (in the case of monocarboxylic acid) or R' is the group

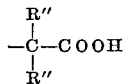

in the case of dicarboxylic acids. R" is preferably an alkyl group such as methyl or ethyl. Examples of such acids are α,α-dimethyl valeric; α-ethyl, α-methyl caproic; α,α-dimethyl propionic; α,α-dimethyl octanoic; α,α,α',α'-tetramethylpimelic acid; etc.

The additive of the invention can also be used in compositions containing complex esters. Thus, complex esters, while generally too viscous to be used per se, are frequently used as blending agents with other less viscous esters to tailor-make an ester lubricant composition. The more important of the complex esters can be represented by the general formula:

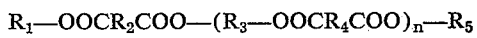

wherein $R_1$ and $R_5$ are alkyl radicals of monohydric alcohol, preferably neo alcohols, i.e., alcohols having no beta hydrogens, $R_2$ and $R_4$ are hydrocarbon radicals of dicarboxylic acid, and $R_3$ is the divalent hydrocarbon or hydrocarbonoxy radical of a glycol or polyglycol, which glycol or polyglycol preferably has no beta hydrogens. "n" in the complex ester molecule will usually range from 1 to 6, usually 1 to 3, depending upon the product viscosity desired which is controlled by the relative molar ratio of the glycol or polyglycol to the dicarboxylic acid. In preparing the complex ester, there will usually be some simple ester formed, i.e., n=0, but this will generally be a minor portion, e.g., 10 to 40 wt. percent of the complex ester esterification reaction product.

Some specific materials used in preparing the above types of complex esters are as follows: neo alcohols having 6 to 13 carbon atoms such as 2,2,4-trimethylpentanol-1; 2,2-dimethylhexanol-1; 2,2-dimethylpentanol-1; 1-methylcyclohexylmethanol; 2,2-dimethylbutanol-1; 2,2-dimethyldecanol-1; $C_6$ to $C_{12}$ dicarboxylic acids such as sebacic, adipic, azelaic and dodecanedioic acid; neo glycols such as 2,2-dimethylpropanediol-1,3; 2-ethyl-2-butylpropanediol-1,3; 2,2-diethylpropanediol-1,3; 2,2-dimethylbutanediol-1,3; etc. In general, the complex esters will have a total of 20 to 80, preferably 40 to 65, carbon atoms per molecule. Complex esters and methods for their preparation are known in the art and have been described in various patents. Preferably the complex esters are prepared by reacting 1 mole of glycol, 2 moles of dicarboxylic acid and 2 moles of alcohol. This will result in about 35 wt. percent of diester of the dicarboxylic acid and alcohol, and about 65 wt. percent of complex ester of the formula:

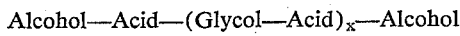

where x averages about 1.8.

The additive of the invention can also be used in compositions containing ether glycol oils which include those of the following general formula:

wherein R is a straight or branched-chain alkyl group of 1 to 20, e.g. 3 to 10, carbon atoms, R' is an aliphatic hydrocarbon radical, either branched or straight chain of about 1 to 5, e.g., 2 to 3 carbon atoms, R" is either hydrogen or R, and x is a number of 5 to 50, e.g., 20 to 40. Also included are polyglycol ethers, wherein the polymer chain may consist of different alkylene oxide groups, e.g., ethylene oxide and propylene oxide in the same chain. Also, in the case of diethers, the terminal alkyl groups may be the same or different. Materials of the above type and their preparation are well known in the art and have been described in numerous patents, e.g., U.S. 1,976,678; 2,425,845; 2,520,611; 2,520,612; etc. An example of such a commercially available polyglycol monoether material is sold under the trade name Ucon Lubricant LB-1145 which is a monoether polyglycol prepared from n-butyl alcohol and propylene oxide. This material has a viscosity of 1145 SUS at 100° F.

The additive of the invention can be used in compositions containing other lubricating oil additives such as polymeric additives which are used as dispersant V.I. improvers. These polymeric materials generally have viscosities at 210° F. of 300 to 700 cs., preferably 600 to 700 cs., as 30% to 50% concentrates in di-2-ethylhexyl sebacate. These polymers consist of a carbon to carbon backbone having various side chains which impart to the polymer its viscosity index and dispersancy improving properties. One type of such polymers is that prepared by copolymerizing a polar monomer with various unsaturated esters. The esters can be esters of unsaturated mono- or dicarboxylic acids, or esters of unsaturated alcohols, as well as various combinations thereof.

The polar monomers include 2-N-vinylpyrrolidone, maleic anhydride, alkenes, ether substituted alkenes and hydroxy substituted alkenes.

The preferred ester monomers are prepared from $C_2$ to $C_6$ carboxylic acids and $C_2$ to $C_{20}$ alcohols with at least one of said acids or said alcohols containing an ethylenic unsaturation. Usually about 1 to 20 mol. percent of the polymer will be the polar monomer, while the remainder is the ester monomer. The copolymerization is generally carried out by using peroxide type catalysts such as benzoyl peroxide under conventional conditions.

A specific copolymer which was used in several of the examples of the invention is commercially available under the name "Acryloid HF-866." This material is a concentrate of about 30 wt. percent copolymer of a methacrylate ester and 2-N-vinylpyrrolidone in about 70 wt. percent di-2-ethylhexyl sebacate. The intrinsic viscosity of the copolymer in toluene is about .88. The aforesaid methacrylate ester component of the copolymer comprises a mixture of esters having alkyl groups within the range of about 4 to 16 carbon atoms and averaging about 9 carbon atoms per alkyl group in the ester.

Various other additives can also be added to the lubricating compositions of the invention in amounts of about 0.001 to 10.0 weight percent each, based on the total weight of the composition. Examples of such additives include: rust preventives such as calcium petroleum sulfonate or sorbitan monooleate; V.I. improvers such as the polymethacrylates; oxidation inhibitors such as phenyl-alpha-naphthylamine, para-aminodiphenylamine, 3,7-dioctyl phenothiazine, p,p'-dioctyldiphenylamine and phenothiazine; load carrying agents such as tricresyl phosphate and free sebacic acid; antifoamants such as the silicones; pour point depressants; dyes, grease thickeners; other ester oils; other synthetic lubricating oils; and the like.

The invention will be further understood by reference to the following examples which include a preferred embodiment of the invention.

EXAMPLE I

A flask equipped with thermometer, stirrer, charging inlet, and a condenser was charged with 147 gms. (1 mole) of L-glutamic acid, 316 gms. (2 moles) of neo-decanol, about 1 gram of para-toluenesulfonic acid as a catalyst, and about 25 ml. of heptane as a water entraining agent. The mixture was then refluxed at atmospheric pressure for about five hours during which time 36 grams of water was distilled over. The residue was filtered free of catalyst, washed with 10% aqueous $Na_2CO_3$ solution, water washed, washed again with 10% aqueous $Na_2CO_3$ solution, water washed, washed again with 10% aqueous $Na_2CO_3$ solution, again water washed, and then distilled to remove water, heptane, and the unreacted alcohol. Then, the residue was distilled at about 194 to 207° C. under 3 mm. Hg pressure to give the final product.

The neodecanol used above had the structure:

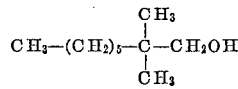

EXAMPLE II

A condensation product of L-glutamic acid with 2,2,4-trimethylpentanol was prepared in the same manner as described above with regard to Example I except for the difference in alcohols. The properties of the condensation product obtained by this reaction, as well as that of Example I, are summarized in Table I which follows:

EXAMPLE III

A series of oxidation tests were carried out using the product of Example I as an additive in ester oil. The tests were carried out on the following compositions:

*Composition A.*—100% trimethylolpropane mononeoheptanoate dipelargonate.

*Composition B.*—100 parts by weight of Composition A and 1 part by weight of the reaction product of Example I.

These compositions were then tested for oxidation stability by blowing saturated air at 425° F. through a 2500 ml. sample of the composition to be tested. The air was blown through at a rate of 250 liters per hour while the sample was maintained at 425° F. The viscosity of the sample at 100° F. was measured at the end of 25, 50, 75, and 100 hour periods. The results of this oxidation test are summarized in Table II which follows:

*Table II.—Oxidation stability*

| | Composition A (no additive), cs. | Composition B (1% Reaction Product of Example I), cs. |
|---|---|---|
| Initial | 24.02 | 27.97 |
| 25 hours | 83.22 | 79.99 |
| 50 hours | 355.2 | 149.0 |
| 75 hours | 2,015.3 | 375.7 |
| 100 hours | (¹) | 2,011.0 |

¹ Solid.

As seen by the preceding table, the ester per se (i.e. Composition A) became solid after air blowing for 100 hours, while the addition of the additive of the invention inhibited oxidation as indicated by the lower viscosities.

EXAMPLE IV

The additive reaction product of Example I was next tested in a fully compounded aircraft engine lubricating oil, hereafter denoted as Composition C, to demonstrate its oxidation inhibiting activity in the presence of other additives.

*Composition C.*—This aircraft engine lubricating oil consisted of a base oil which was a blend of 85 vol. percent of di-2,2,4-trimethylpentyl sebacate and 15 vol. percent of a complex ester composition. The complex ester composition was prepared by the simultaneous reaction of 2 molar proportions of 2,2,4-trimethylpentanol-1, 2 molar proportions of sebacic acid, and 1 molar proportion of neopentyl glycol. Into 100 parts by weight of this base oil was dissolved by simple mixing 3 parts by weight of phenyl-alphanaphthylamine, 2 parts by weight of Acry-

*Table I.—Physical characteristics of the reaction products of Examples I and II*

| | Example I | Example II |
|---|---|---|
| Appearance | Solid, Colorless | Solid, Colorless. |
| Saponification No., mg. KOH/gm | 235.4 | 308.5. |
| Total Acid No., mg. KOH/gm | 0.80 | 0.94. |
| Percent Carbon | 66.73 | |
| Percent Hydrogen | 10.03 | |
| Percent Nitrogen | 5.17 | |
| Boiling Point | 194–207° C./3 mm. Hg | 190° C./4 mm. Hg. | loid HF-866, and 2 parts by weight of p,p'-dioctyldiphenylamine.

*Composition D.*—1 part by weight of the reaction product of Example I was dissolved by simple mixing in 100 parts by weight of Composition C.

Compositions C and D were then subjected to the Oxidation Stability Test previously described. The results are summarized in Table III which follows:

*Table III.—Oxidation Stability Test*

| Hour | Composition C (no inhibitor) | | | Composition D (1% product of Example I) | | |
|---|---|---|---|---|---|---|
|  | KV/210° F., cs. | KV/100° F., cs. | T.A.N.[1] | KV/210° F., cs. | KV/100° F., cs. | T.A.N.[1] |
| 0 | 6.003 | 26.73 | 0.14 | 6.006 | 26.97 | 0.10 |
| 25 | 6.280 | 30.99 | 9.40 | 6.150 | 30.48 | 7.49 |
| 100 | 16.925 | 138.6 | 56.4 | 10.390 | 67.29 | 31.2 |

[1] T.A.N.=total acid number, mg. KOH/g.

As seen by Table III, the use of 1% of the reaction product of Example I in Composition D inhibited oxidation of the oil composition as measured by the smaller increase in kinetic viscosity (KV) and total acid number (T.A.N.) as compared to Composition C without this reaction product.

EXAMPLE V

*Composition E*—(*all parts by weight*).—Another finished aircraft engine oil was made up consisting of 100 parts trimethylolpropane trioctanoate, 5 parts p,p'-dioctyldiphenylamine, 0.4 part phenothiazine, 1.5 parts of Acryloid HF-866, 0.015 part sebacic acid and 0.001 part of a silicone antifoamant.

*Composition F.*—1 part by weight of the reaction product of Example I was added to 100 parts by weight of Composition E.

*Composition G.*—1 part by weight of the reaction product of Example II was added to 100 parts by weight of Composition E.

Compositions E, F, and G were tested for 100 hours in the Oxidation Stability Test previously described. The results obtained at the end of 100 hours testing are summarized in Table IV which follows:

*Table IV*

|  | Composition | | |
|---|---|---|---|
|  | E | F | G |
| Percent vis. Inc./100° F | 117 | 74.5 | 115 |
| Δ T.A.N | 12.14 | 5.75 | 6.34 |

Compositions F and G, representing the invention, had significantly reduced oxidation as compared to Composition E. Thus, after 100 hours on test, Composition E increased in total acid number by 12.14 mg. KOH/gram, while Compositions F and G increased by 5.75 and 6.34 mg. KOH/gm., respectively.

EXAMPLE VI

*Composition H.*—A lubricating composition was prepared having a base oil consisting of 93 wt. percent of trimethylolpropane trioctanoate and 7 wt. percent Ucon 1145. To 100 parts of this base oil was added and dissolved therein 5 parts p,p'-dioctyldiphenylamine, 0.5% phenyl-alpha-naphthylamine, 0.015 part sebacic acid and 0.001 part of a silicone antifoamant, all of said parts being by weight.

*Composition I.*—To 100 parts by weight of Composition H, was added 3 parts by weight of Arochlor 1254 which is a chlorinated biphenyl sold by Monsanto Chemical Company and used as a load-carrying agent.

*Composition J.*—To 100 parts by weight of Composition H, was dissolved therein 1 part of the reaction product of Example II.

Compositions I and J were then tested in a Type II Bearing Rig Test.

Briefly described, a 100 mm. diameter aircraft steel roller bearing rotating at 10,000 r.p.m. is maintained at a temperature of 500° F. while being sprayed for 100 hours with a jet of the oil composition heated to a temperature of about 440° F. in a sump so as to have a jet-in-temperature of 400° F. The oil falls off the bearing into a reservoir or sump where it is picked up by a pump and recirculated. The total amount of oil in the circulating system is about 2 gallons. Oils showing good oxidation stability will show very little change in viscosity and T.A.N. during the bearing test, while oils poor in oxidation stability will tend to break down and rapidly increase in viscosity and T.A.N. Also at the end of the 100 hour test, the bearing is examined for cleanliness.

The results obtained are summarized in Table V which follows:

*Table V*

|  | Composition | |
|---|---|---|
|  | I | J |
| Consumption, ml./hr | 29.5 | 25.9 |
| Sludge, g | 0.3262 | 0.0396 |
| Percent Vis. Inc./100° F | 51.4 | 28 |
| Δ T.A.N | 3.19 | 1.74 |
| Overall deposit rating on bearing, mount and sump | (¹) | (²) |

[1] Good.
[2] Excellent.

Thus, the lesser increase in viscosity, total acid number, and sludge shows that the presence of the inventive inhibitor in Composition J significantly inhibits oil oxidation in actual lubrication of an aircraft bearing under simulated operating conditions.

What is claimed is:

1. A lubricating composition comprising a major amount of saturated aliphatic carboxylic polyester lubricating oil, and an oxidation inhibiting amount within the range of 0.1% to 10.0 wt. percent of reaction product of an aliphatic amino dicarboxylic acid of the formula:

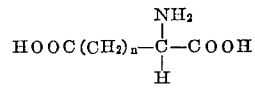

wherein $n$ is 2 to 3, and a $C_1$ to $C_{20}$ alkanol, prepared by heating said acid and said alkanol together under reflux conditions until about two molar proportions of water are removed per each molar proportion of said acid.

2. A lubricating composition according to claim 1 wherein $n$ is 2 and said alkanol is a $C_5$ to $C_{13}$ alkanol.

3. A synthetic ester lubricating oil composition suitable for high temperature lubrication comprising a major amount of saturated aliphatic carboxylic polyester lubricating oil, and about 0.1 to 10.0 wt. percent of reaction product of an aliphatic amino dicarboxylic acid of the formula:

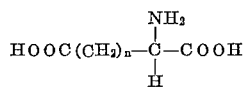

wherein $n$ is 2 or 3, and a $C_5$ to $C_{13}$ alkanol, prepared by heating under reflux conditions said acid and said alkanol until about two molar proportions of water are removed per each molar proportion of said acid.

4. A composition according to claim 3, wherein said ester lubricating oil is an ester of a dicarboxylic acid and a monohydric alcohol.

5. A composition according to claim 4, wherein said ester lubricating oil is an ester of a $C_6$ to $C_{12}$ saturated aliphatic dicarboxylic acid and a $C_4$ to $C_{12}$ aliphatic saturated neo alcohol.

6. A synthetic ester lubricating oil composition suitable for high temperature lubrication, comprising a major amount of a synthetic saturated aliphatic carboxylic polyester lubricating oil and about 0.5 to 5.0 wt. percent of the condensation product of L-glutamic acid and alcohol of the formula:

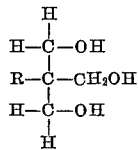

wherein R is a $C_2$ to $C_8$ alkyl group, prepared by heating a mixture of said acid and said alcohol under reflux conditions and removing about two molar proportions of water per molar proportion of said acid.

References Cited by the Examiner

UNITED STATES PATENTS

| | | | |
|---|---|---|---|
| 2,207,063 | 7/1940 | Liston | 44—71 |
| 2,317,378 | 4/1943 | Harris | 260—482 X |
| 2,369,090 | 2/1945 | Trautman | 252—51.5 X |
| 2,371,333 | 3/1945 | Johnston | 252—51.5 |
| 2,421,233 | 5/1947 | Auchincloss et al. | 260—482 |
| 2,790,000 | 4/1957 | Norman et al. | 260—326.3 X |
| 2,802,864 | 8/1957 | Vassel | 252—403 X |
| 3,043,774 | 7/1962 | Coffield | 252—51.5 |
| 3,121,691 | 2/1964 | Eickemeyer | 252—51.5 |

FOREIGN PATENTS

| | | |
|---|---|---|
| 218,016 | 11/1961 | Austria. |
| 517,081 | 10/1955 | Canada. |

DANIEL E. WYMAN, *Primary Examiner.*

P. P. GARVIN, *Assistant Examiner.*